July 9, 1963  P. D. WALSH  3,096,664
REMOTELY CONTROLLED REAR VIEW MIRROR
Filed Aug. 19, 1960  2 Sheets-Sheet 1

INVENTOR.
Phillip D. Walsh
BY
ATTORNEY

July 9, 1963 P. D. WALSH 3,096,664
REMOTELY CONTROLLED REAR VIEW MIRROR
Filed Aug. 19, 1960 2 Sheets-Sheet 2

INVENTOR.
Phillip D. Walsh
BY
*B. E. McGlynn Jr.*
ATTORNEY

United States Patent Office 3,096,664
Patented July 9, 1963

3,096,664
REMOTELY CONTROLLED REAR VIEW MIRROR
Phillip D. Walsh, Anderson, Ind., assignor to General Motors Corporation, Detroit, Mich., a corporation of Delaware
Filed Aug. 19, 1960, Ser. No. 50,783
1 Claim. (Cl. 74—501)

This invention pertains to a remotely controlled mirror mechanism of the type comprising a mirror assembly and an actuator assembly located remotely therefrom and adapted to be operated to selectively position the mirror assembly and, in particular, to such a mirror mechanism of the cable-operated type comprising improved means for mounting and adjusting the mirror assembly.

Generally speaking, remotely controlled mirror mechanisms of the cable-operated type typically comprise a mirror assembly and mounting structure therefor supported in some convenient location exteriorly of an automotive vehicle, and adapted to be selectively positioned remotely by means of an actuator assembly located in a convenient position within the vehicle passenger compartment. Commonly, in prior known structures of this type, the mirror mounting structure has included a mirror support head comprising a ball member completely confined and supported universally within a socket member. One or the other of the ball and socket members is secured to a mounting bracket or support, while the other member is secured to the mirror assembly. In order to remotely position the mirror assembly, a plurality of flexible operating cables, usually three in number, have their opposite ends respectively directly connected to the mirror assembly and the remotely located actuator, whereby universal manipulation of the latter will selectively position and retain in position the mirror assembly about the ball joint connection.

Therefore, in cable-operated mirrors of this type, the mirror assembly has been supported on its mounting bracket solely by the ball and socket universal pivot connection aforedescribed. Apart from cost and assembly considerations, such a pivot and support connection often results in the repeated need for readjusting or repositioning the mirror. For example, external forces, such as vehicle vibrations or otherwise unintentional disruption of the selected position of the mirror as when a service station attendant is cleaning the surface thereof, often cause the reflecting surface of the mirror to be moved from its selected plane in which the vehicle operator has optimum vision to the rear. Thus, after being so dislodged from its selected position, the mirror must be repositioned by manipulation of the actuator located within the vehicle passenger compartment.

Another problem presented by such cable-operated mirrors is prompted by the fact that the distance between the mirror assembly and the remotely located actuator often varies from car to car. Consequently, slack often appears in one or more of the operating cables resulting in difficulty in adjusting and, equally importantly, in retaining the mirror assembly in a selected position.

It is, therefore, a principal object and feature of this invention to provide an improved remotely controlled mirror mechanism of the type aforedescribed in which the mirror assembly is maintained in universally adjustable supported engagement with its mounting bracket or support exteriorly of the vehicle by means of a remotely located actuator assembly which is so constructed and arranged as to provide means for imposing tension on the operating cables to thereby maintain the components of the ball and socket mirror connection in bearing engagement with each other.

It is yet another object and feature of this invention to provide a remotely controlled mirror mechanism comprising a mirror structure mountable upon the exterior of the vehicle and including a mounting bracket and a mirror assembly, a ball and socket connection therebetween including an open socket member receiving a cooperating ball member, a plurality of operating cables directly connected to the mirror assembly and to a remotely located manually universally adjustable actuator member which may be operated to universally adjust the mirror assembly relative to its support bracket about the ball and socket connection aforementioned, and adjustable means associated solely with the actuator for imposing tension on the operating cable within relatively great limits which is the sole means for maintaining the mirror-supporting ball member within its open socket.

It is yet another object and feature of this invention to provide an improved actuator assembly of the type aforedescribed in which the actuator includes a ball and socket mounting structure which is freely adjustable to impose within relatively great limits a predetermined tension on the operating cables to remove slack therefrom, as well as to maintain the ball member of the mirror head in bearing engagement with its associated open socket.

In general, these and other objects of the invention are attained in a remotely controlled mirror mechanism comprising a mirror mounting bracket or support located exteriorly of an automotive vehicle, a parti-spherical ball member or bearing surface, a mirror including a parti-spherical bearing surface defining an open socket universally adjustably receiving the aforementioned ball member, a plurality of flexible operating cables connected to the mirror and, at their opposite ends, to a remotely located manually operable actuator which may be adjusted to impose tension on the cables to maintain the ball member within its open socket while removing slack from the cables. More specifically, the actuator includes a fixed support or housing having a bushing adjustably threadably received therein and including a bore therethrough receiving a support pin. The support pin includes a parti-spherical ball member at one end thereof engaged in an open socket formed on the manually operable actuator. Spring means acts between the adjustable bushing and the support pin to urge the latter into engagement with the open socket on the actuator thereby not only tensioning the cables to take the slack therefrom, but also to maintain the ball and socket members of the mirror head and actuator in universal bearing engagement with each other. Moreover, the aforementioned bushing may be threadably adjusted relative to the actuator housing so as to control the degree or extent of tension imposed on the cables for the foregoing purposes.

The nature of this invention, and the manner in which the foregoing objects are attained, will become more apparent hereinafter as the description of the invention proceeds, and in which reference is made to the following drawings in which.

Figure 1:
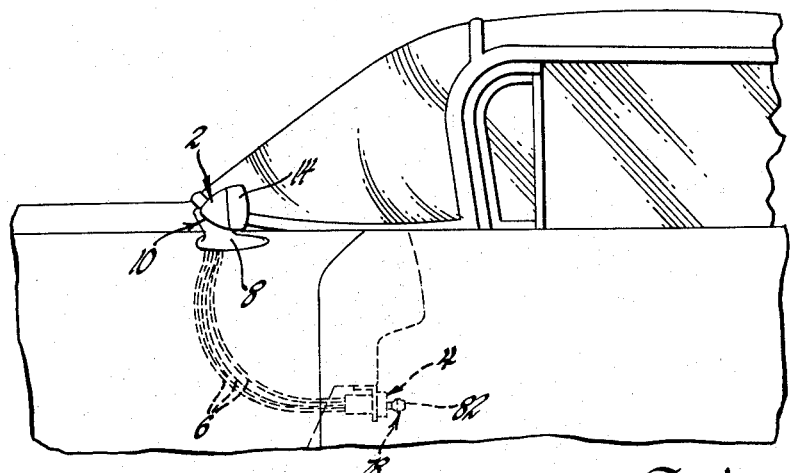
FIGURE 1 is a fragmentary side elevation of a vehicle equipped with a preferred embodiment of the invention.
Figure 2:
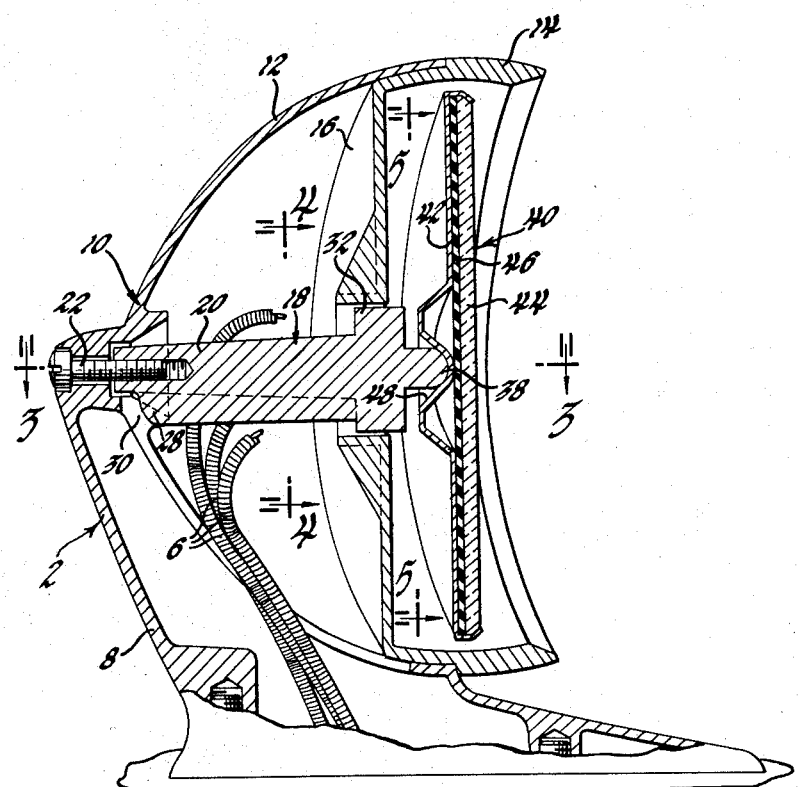
FIGURE 2 is an enlarged fragmentary view of FIGURE 1 illustrating certain details of the mirror assembly.
Figure 3:
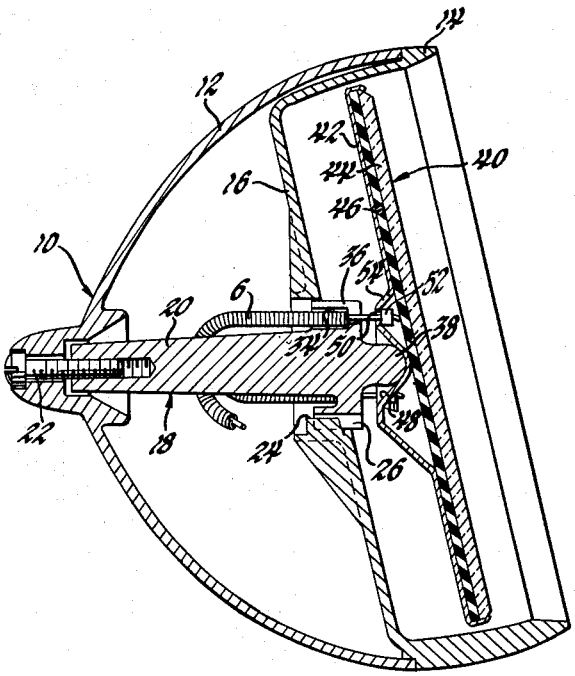
FIGURE 3 is a view taken on line 3—3 of FIGURE 2.
Figure 4:
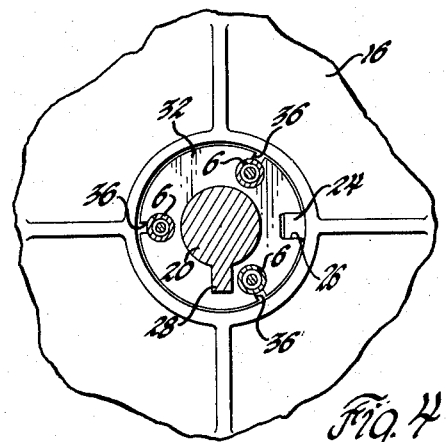
FIGURE 4 is a view taken on line 4—4 of FIGURE 2.
Figure 5:
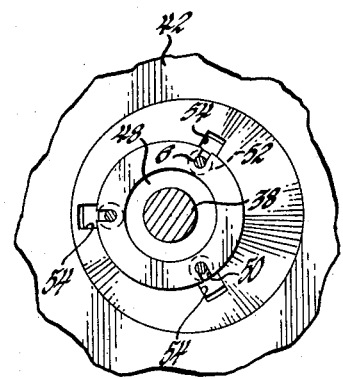
FIGURE 5 is a view taken on line 5—5 of FIGURE 2.

Referring now to the drawings, and particularly to FIGURE 1, there is shown an illustrative embodiment of the invention comprising a mirror structure 2 located on the left front fender of an automative vehicle, and adapted to be remotely positioned by means of an actuator assembly 4 located on or below the vehicle instrument panel or dashboard within the passenger compartment. The actuator assembly and mirror structure are operatively interconnected by three flexible operating cables 6 of well known and conventional construction in that they comprise an inner flexible wire or cable member enclosed in suitable sheathing. At this juncture, it should be noted that the mirror structure 2 may be located in other positions on the vehicle, such as on a door panel thereof, while the actuator assembly 4 may likewise be located in other positions within the vehicle passenger compartment suitably convenient to the vehicle operator.

Referring now to FIGURES 2 through 5 and the details of the mirror structure, the latter may be seen to comprise a mounting bracket 8 having a lower end suitably adapted to be fastened to the fender of the vehicle. If desired, the bracket 8 may be secured to the vehicle fender by means of a well known ball and socket mounting whereby the bracket itself may be adjustable relative to the fender. At the upper end of the bracket, there is a mirror support head 10.

The mirror support head 10 may be seen to comprise an open-ended housing 12 formed integral with the bracket 8. A bezel 14 includes an annular rim suitably retained against the open edge or rim of the housing 12, and a body portion 16 extending across the interior of the housing 12. A cable block and mirror mounting member 18 includes an elongated axially extended shank 20 suitably threaded to receive a threaded fastener 22 extending through the rear of the housing 12 and maintaining the block 18 in position within the housing. The block 18 extends through a suitable opening generally centrally of the bezel body 16. In order to properly orient the housing 12, bezel 14 and cable block 18 relative to each other so as to properly orient the cables with the mirror assembly to be described, there is provided a locating lug 24 on the bezel body 16 which cooperates with a suitable locating notch 26 at the forward end of the cable block, and a similar locating lug or rib 28 on shank 20 seating within a suitable locating notch 30 on the interior surface of the housing 12.

The forward end of the cable block 18 is provided with an annular flange 32 having three recessed bosses 34 substantially equidistantly spaced about the axis of the shank 20. Each recessed boss is provided with a suitable radial slot or opening 36 whereby the ends of the sheaths enclosing each flexible cable 6 may be seated within a recessed boss and the flexible cable slipped through a slot 36 so as to project beyond the forward end of the cable block 18. Finally, the forward central portion of the cable block 18 is provided with a ball member 38 of parti-spherical configuration having its center of curvature substantially axially aligned with the axis of the shank 20 and equidistantly spaced from each of the operating cables 6.

The mirror assembly 40 is essentially of conventional construction in that it comprises a metal body member 42 having its peripheral edge crimped about the reflective miror element 44. A circular gasket 46 is interposed between the rear surface of the mirror element and the mirror body. However, as compared to conventional mirror assemblies, the present assembly is provided with a depression or open socket 48 of generally parti-spherical configuration, and located preferably centrally of the mirror assembly 40. The open socket 48 is adapted to be held in bearing engagement with the ball member 38 by the cable members 6 which have the cable elements thereof passed through suitable openings 50 within the mirror body 42 substantially equidistantly spaced from the center of curvature of the ball member 38. As shown in the drawings, the bare wires of the flexible cables are upset or otherwise deformed to retain thereon a connector block 52 resting against the forward face of the mirror body 42. The blocks 52 may be installed on the cables 6 and then passed through suitable openings 54 in morror body 42 communicating with openings 50. As will appear hereinafter, tension imposed upon each of the respective operating cables 6 continuously urges the open socket 48 into universally adjustable supported engagement upon the ball member 38.

Figure 6:
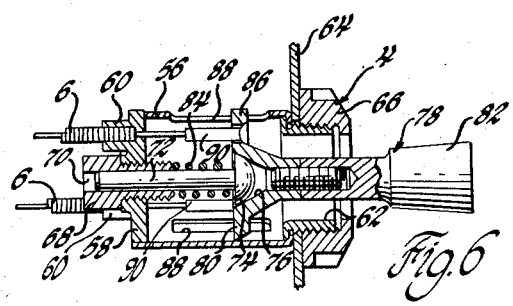
FIGURE 6 is an enlarged longitudinal section of the actuator assembly of FIGURE 1.

The actuator assembly 4 for adjustably positioning the mirror assembly 40 relative to housing 12 and for imposing cable tension to take slack out of the cables and to maintain the ball element 38 seated within the open socket 48 may be seen by referring particularly to FIGURE 6. The actuator assembly comprises a substantially tubular housing 56, one end of which is suitably secured to a closure plate or base wall 58 having three suitable recessed bosses 60 for receiving the sheathed cable 6. The other end of the housing axially opposite the base wall 58 is crimped or otherwise suitably secured to an externally threaded bushing 62 adapted to extend through a suitable aperture within a mounting panel 64. Cooperating means may be formed between the bushing 62 and the panel 64, much in the same fashion as the locating rib 28 and notch 30 on the mirror head, to suitably orient the housing relative to the panel. The internally threaded nut 66 is received upon the bushing 62 in abutment with the panel 64 to firmly secure the assembly to the panel.

A bushing 68 having a central bore 70 therethrough is adjustably threadably received in the base wall 58 so as to align its bore axially with the open end of the housing 56 or bushing 62 and the opening in the nut 66. A support pin 72 is reciprocably disposed within the bushing bore 70 and includes at its inner end within the housing a parti-spherical ball element or bearing surface 74 adapted to be received within an open socket 76 formed centrally of a manually operable actuator 78 which includes an annular flange 80 and a handle 82 which projects exteriorly of the housing 56 for access by the vehicle operator. The yieldable spring 84 is seated against one end of the bushing 68 and the ball element 74 on the end of the pin 72 so as to urge the ball element 74 into bearing engagement with the open socket 76 on the actuator handle.

The flange 80 is mounted freely within the housing 56 with some clearance therebetween, the flange being provided with at least one radially projecting lug 86 extending into one of the axially extending slots 88 in the housing to prevent undesired relative rotation between the actuator 78 and the housing 56. Additionally, the periphery of the flange 80 is slotted in a fashion generally similar to the cable block 18 aforedescribed so as to permit slipping the cable fittings 90 on the free ends of the operating cables 6 through such slots for connection to the actuator.

It will now be apparent that the entire actuator assembly comprising the flange 80 and handle 82 is mounted freely within the interior of the housing 56, and may be adjusted axially within the housing within relatively great limits imposed by abutment of the projection 86 with the ends of a given slot 88. To accomplish such adjustment, it is merely necessary to adjust the threaded bushing 68 within the base wall 58, resulting in positioning the spring 84 to provide the necessary cable tension to remove slack from the latter, to dispose the ball element 74 in snug engagement with the open socket 76, and to maintain the mirror head socket member 48 in supported engagement on ball member 38.

As will be apparent from the preceding description with respect to the mirror support head 10, the various components thereof are adapted to be assembled in a predetermined relationship to properly orient the operating cables with respect to the adjustable mirror body 42. Additionally, the actuator housing may be suitably provided with similar means for locating it relative to the support panel 64 so that the operating cables 6 will be properly oriented between the actuator and the mirror head. Again, it may be noted that in assembling the mechanism, the threaded bushing 68 may be adjusted toward the panel 64 to urge the ball element 74 into engagement with its open socket 76 in the actuator 78, thereby causing the actuator to be moved axially away from the base wall 58 of the housing within limits imposed by the locating lug 86 riding within a slot 88. By such action, tension is imposed on each of the cables 6 to take slack out of them, while additionally performing the important function of continuously urging the socket member 48 on mirror body 42 into supported engagement with the cooperating ball member 38 on the cable block 18, and further supporting the socket 76 on the actuator 78 on the parti-spherical bearing surface 74.

In operation, the actuator handle 82 may be grasped and universally manually adjusted or wobbled about an axis which, in effect, is at the center of curvature of the spherical end of the pin 72. The projection 86 of the actuator 78 properly orients the latter relative to the housing, and prevents relative rotation therebetween. As the actuator assembly is operated, various cables or combinations thereof are pulled upon while others or combinations thereof are released to universally adjust the mirror body 42 and its mirror about the parti-spherical ball member 38. Once a selected mirror position is obtained, the operating handle of the actuator is left in this position, and the mirror is retained in the selected position. As required, and particularly during installation, the adjustable bushing 68 may be manipulated so as to impose the necessary load on the spring 84 thereby moving the actuator 78 to tension the cables for the purposes aforedescribed.

Thus, the actuator mounting means comprising the adjustable bushing 68, spring 84 and support pin 72 provides a relatively simple and readily accessible means for adjusting the entire remote control mechanism between the actuator assembly 4 and the mirror to be controlled. Also, it should be emphasized that the influence of the spring 84 acting between the actuator 78 and the mirror head 10 causes the respective ball and socket connections thereof to be maintained in firm engagement, thereby resisting dislodgement of the position of the mirror due to vehicle vibrations and the like.

While but one form of the invention has been selected for a descriptive illustration thereof, other forms will now be apparent those skilled in the art. Therefore, the embodiment shown in the drawings is merely for illustrative purposes, and is not intended to limit the scope of the invention which is defined by the claim which follows.

I claim:

A remote control mechanism comprising a fixed support, a device to be controlled, a pivot connection between said support and said device including a ball member seated within an open socket; an actuator assembly located remotely from said support and comprising a fixed housing having an open end and a base opposite thereto, an axial slot in the side wall of said housing, a bushing adjustably threadably engaged in said base and having a bore therein substantially axially and centrally aligned with the open end of said housing, a support pin reciprocably disposed in said opening and having a spherical bearing surface at one end thereof within said housing, a manually operable actuator freely mounted for axial movement within said housing and including an open socket receiving said bearing surface, an operating handle connected to said actuator and extending through the open end of said housing, spring means acting between said bushing and support pin to urge said bearing surface into engagement with said socket on said actuator and to urge the latter axially away from said housing base, a lug on said actuator extending radially into said slot to limit axial and rotary movement of said actuator relative to said housing; and a plurality of operating cables having the opposite ends thereof respectively directly connected to said device and actuator at points spaced respectively from said pivot connection and said bearing surface whereby said spring means in response to adjustable movement of said bushing urges said actuator axially away from said housing base to tension said cables substantially equally thereby maintaining said ball member within said socket on said device and said bearing surface within said socket on said actuator.

References Cited in the file of this patent

UNITED STATES PATENTS

| | | |
|---|---|---|
| 1,492,682 | Foster | May 6, 1924 |
| 1,560,039 | Castino | Nov. 3, 1925 |
| 2,746,356 | Wells | May 22, 1956 |
| 2,931,245 | Jacobson | Apr. 5, 1960 |
| 3,046,840 | Barcus | July 31, 1962 |